United States Patent
Kesselmans et al.

(10) Patent No.: US 6,822,091 B1
(45) Date of Patent: Nov. 23, 2004

(54) OXIDATION OF STARCH

(75) Inventors: Ronald Peter W. Kesselmans, Annen (NL); Ido Pieter Bleeker, Ten Boer (NL)

(73) Assignee: Cooperative Verkoop-en Productievereniging van Aardappelmeel en Derivaten AVEBE B.A., Veendam (NL)

( * ) Notice: Subject to any disclaimer, the term of this patent is extended or adjusted under 35 U.S.C. 154(b) by 0 days.

(21) Appl. No.: 09/763,380

(22) PCT Filed: Sep. 13, 1999

(86) PCT No.: PCT/NL99/00568

§ 371 (c)(1),
(2), (4) Date: Mar. 29, 2001

(87) PCT Pub. No.: WO00/15670

PCT Pub. Date: Mar. 23, 2000

(30) Foreign Application Priority Data

Sep. 11, 1998 (EP) .............................. 98203043

(51) Int. Cl.[7] .......................... C08B 31/18; C08B 31/00; C07H 1/00
(52) U.S. Cl. ......................... 536/105; 536/102; 536/124
(58) Field of Search ................................ 536/105, 102, 536/124

(56) References Cited

U.S. PATENT DOCUMENTS

| | | |
|---|---|---|
| 3,539,366 A | 11/1970 | Ewing |
| 3,665,644 A | 5/1972 | Durand |
| 3,975,206 A | 8/1976 | Lotzgesell et al. |
| 4,943,612 A * | 7/1990 | Morita et al. ............... 524/714 |

FOREIGN PATENT DOCUMENTS

| | | |
|---|---|---|
| EP | 0799837 A2 * | 10/1997 |
| JP | 07138898 | 5/1995 |
| WO | WO-9704167 A1 * | 7/1995 |

OTHER PUBLICATIONS

"Oxidation of Potato Starch by Hydrogen Peroxide", P Parovuori et al., STÄRKE, vol. 47, No. 1, 1995, pp. 19–23, XP002091292.

"Oxidation of Amylopectin with Hydrogen Peroxide at Different Hydrogen Ion Concentrations", Whistler et al., *The Journal of the American Chemical Society*, vol. 81, 1959, pp. 3136–3139, XP002091293.

* cited by examiner

*Primary Examiner*—James O. Wilson
*Assistant Examiner*—Everett White
(74) *Attorney, Agent, or Firm*—Hoffmann & Baron, LLP

(57) ABSTRACT

The invention relates a process of oxidizing starch wherein a root or tuber starch comprising at least 95 wt. % based on dry substance of the starch amylopectin, or a derivative therof, is treated with hydrogen peroxide in the presence of a catalyst, which catalyst comprises divalent copper ions. The present invention further relates to an oxidizable starch obtainable by a process comprising treating a starch with hydrogen peroxide in the presence of a catalyst, which catalyst comprises divalent copper ions.

10 Claims, No Drawings

OXIDATION OF STARCH

This application is a 371 of PCT/NL99/00568, filed Sep. 13, 1999.

BACKGROUND OF THE INVENTION

The invention relates to the oxidation of starch.

The oxidation of starch is usually carried out in order to reduce the viscosity of the starch in solution or dispersion. During the oxidation reaction, starch molecules are broken down, yielding molecules having a decreased molecular weight.

Oxidized starches have found many applications in industry. Examples of common applications include the use of oxidized starch in the paper industry, for instance in coatings or surface sizing, the adhesive industry, the textile industry, and the food industry.

The preparation of oxidized starches is conventionally carried out by oxidation with an alkali metal hypochlorite, which is a relatively cheap oxidizing agent. The oxidation of starch using an alkali metal hypochlorite is extensively described in the literature (see among others "Modified Starches: Properties and Uses", O. B. Wurzburg, CRC Press Inc., 1987).

Although the oxidation of starch using an alkali metal hypochlorite is an efficient reaction, leading to high yields of desired product in a relatively short reaction time, it has some disadvantages. One disadvantage is that a large amount of salts is produced, in particular chloride salts, during the oxidation. Other disadvantages are the risk of chlorine formation during the reaction and of the occurrence of unacceptably high AOX levels.

In order to overcome the problems associated with these disadvantages, attempts have been made to find an alternative oxidizing agent. One alternative oxidizing agent that has received a significant amount of attention is hydrogen peroxide.

As early as in 1933, in the German Patent 738909, a process has been described wherein starch is oxidized using only hydrogen peroxide as oxidizing agent. The reaction is performed under semi-dry conditions at a temperature below 60° C. The obtained oxidized starch product was intended to be used in puddings. It has meanwhile been found, however, that this process does not lead to a considerable extent of break down of the starch molecules in a reasonable reaction time. In other words, the disclosed process is very slow.

In order to improve the reaction rate of the oxidation of starch using hydrogen peroxide, it has been proposed to use metal catalysts in said oxidation reactions. In the international patent application WO-A-97/35888, it has been proposed to use metal based coordination complexes as catalysts in an alkaline slurry reaction of starch with hydrogen peroxide. The disclosed coordination complexes are based on a transition metal selected from groups VIIb, VIIb,, VIIIb or the lanthamide series of the Periodic Table. The complexes further comprise an organic ligand containing at least three nitrogen atoms which coordinate to the metal, and a bridging group.

From U.S. Pat. No. 3,655,644, the use of copper as a catalyst in the oxidation of starch using hydrogen peroxide is known. Although the patent mentions general amounts of copper of from 5 to 100 ppm, according to the examples at least 50 ppm needs to be used.

Disadvantages of the known processes for oxidizing starch using hydrogen peroxide and a metal based catalyst are that undesirably high amounts of catalyst (50 ppm) are required in order to be able to degrade the starch to a sufficient extent (intrinsic viscosity 0.1–1.5 dL/g) within a reasonable reaction time (less than 24 hours).

SUMMARY OF THE INVENTION

The present invention aims to provide a process for oxidizing starch using hydrogen peroxide, which process does not have the disadvantages of the prior art. More in particular, it is an object of the invention to provide a process for oxidizing starch using hydrogen peroxide, which process leads to a sufficiently degraded starch product in a relatively short reaction time.

DETAILED DESCRIPTION OF THE INVENTION

Surprisingly, it has been found that the above objectives may be reached by starting from a specific type of starch; which has a very low amylose content. Thus, the invention relates to a process of oxidizing starch, wherein a root or tuber starch comprising at least 95 wt. % based on dry substance of the starch of amylopectin, or a derivative thereof, is treated with hydrogen peroxide in the presence of a catalyst, which catalyst comprises divalent copper ions.

In a process according to the invention, very small amounts of the catalyst suffice in order to provide a process having a high reaction rate. The process of the invention leads, in a short time, to an oxidized starch having a desirably low viscosity and high stability, when in solution.

As has been indicated above, according to the invention, a root or tuber starch is oxidized, which starch has a very high amylopectin content. Most starch types consist of granules in which two types of glucose polymers are present. These are amylose (15–35 wt. % on dry substance) and amylopectin (65–85 wt. % on dry substance). Amylose consists of unbranched or slightly branched molecules having an average degree of polymerization of 1000 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose.

Of some cereal types, such as barley, maize, millet, wheat, milo, rice and sorghum, there are varieties of which the starch granules nearly completely consist of amylopectin. Calculated as weight percent on dry substance, these starch granules contain more than 95%, and usually more than 98% amylopectin. The amylose content of these cereal starch granules is thus less than 5%, and usually less than 2%. The above cereal varieties are also referred to as waxy cereal grains, and the amylopectin starch granules isolated therefrom as waxy cereal starches.

In contrast to the situation of different cereals, root and tuber varieties of which the starch granules nearly exclusively consist of amylopectin are not known in nature. For instance, potato starch granules isolated from potato tubers usually contain about 20% amylose and 80% amylopectin (wt. % on dry substance). During the past 10 years, however, successful efforts have been made to cultivate by genetic modification potato plants which, in the potato tubers, form starch granules consisting for more than 95 wt. % (on dry substance) of amylopectin. It has even been found feasible to produce potato tubers comprising, substantially only amylopectin.

In the formation of starch granules, different enzymes are catalytically active of these enzymes, the granule-bound starch synthase (GBSS) is involved in the formation of amylose. The presence of the GBSS enzyme depends on the activity of genes encoding for said GBSS enzyme. Elimination or inhibition of the expression of these specific genes results in the production of the GBSS enzyme being prevented or limited. The elimination of these genes can be realized by genetic modification of potato plant material or by recessive mutation. An example thereof is the amylose-free mutant of the potato (amf) of which the starch substantially only contains amylopectin through a recessive mutation in the GBSS gene. This mutation technique is described in, inter alia, J. H. M. Hovenkamp-Hermelink et al., "Isolation of amylose-free starch mutant of the potato (*Solanum tuberosum L.*)", Theor. Appl. Gent., (1987), 75:217–221, and E. Jacobsen et al., "Introduction of an amylose-free (amf) mutant into breeding of cultivated potato, *Solanum tuberosum* L., Euphytica, (1991), 53:247–253.

Elimination or inhibition of the expression of the GBSS gene in the potato is also possible by using so-called antisense inhibition. This genetic modification of the potato is described in R. G. F. Visser et al., "Inhibition of the expression of the gene for granule-bound starch synthase in potato by antisense constructs", Mol. Gen. Genet., (1991), 225:289–296.

By using genetic modification, it has been found possible to cultivate and breed roots and tubers, for instance potato, yam, or cassaye (Patent South Africa 97/4383), of which the starch granules contain little or no amylose. As referred to herein, amylopectin potato starch is the potato starch granules isolated from potato tubers and having an amylopectin content of at least 95 wt. % based on dry substance.

Regarding production possibilities and properties, there are significant differences between amylopectin potato starch on the one hand, and the waxy cereal starches on the other hand. This particularly applies to waxy maize starch, which is commercially by far the most important waxy cereal starch. The cultivation of waxy maize, suitable for the production of waxy maize starch is not commercially feasible in countries having a cold or temperate climate, such as The Netherlands, Belgium, England, Germany, Poland, Sweden and Denmark. The climate in these countries, however, is suitable for the cultivation of potatoes. Tapioca starch, obtained from cassaye, may be produced in countries having a warm climate, such as is found in regions of South East Asia and South America.

The composition and properties of root and tuber starch, such as amylopectin potato starch and amylopectin tapioca starch, differ from those of the waxy cereal starches. Amylopectin potato starch has a much lower content of lipids and proteins than the waxy cereal starches. Problems regarding odor and foaming, which, because of the lipids and/or proteins, may occur when using waxy cereal starch products (native and modified), do not occur, or occur to a much lesser degree when using corresponding amylopectin potato starch products. In contrast to the waxy cereal starches, amylopectin potato starch contains chemically bound phosphate groups. As a result, amylopectin potato starch products in a dissolved state have a distinct polyelectrolyte character.

According to the invention, root and tuber starches are oxidized. Surprisingly, under the conditions of the present process, cereal and fruit starches are not degraded to a sufficient extent to obtain a product having the desired characteristics. The oxidation of amylopectin potato starch and amylopectin tapioca starch has been found to lead to particularly advantageous oxidized starches.

Suitable derivatives of the above specific starch to be used in an oxidation process according to the invention are obtainable by crosslinking, etherification, or esterification of the starch, or a combination of two or more of said modifications. These modifications may be performed in any known manner. Examples of suitable manners for obtaining the desired derivatives are for instance disclosed in "Modified Starches: Properties and Uses", O. B. Wurzburg, CRC Press Inc., 1987.

Within these classes of derivatives, particularly preferred derivatives to be oxidized are cationic, anionic and amphoteric starches. For the introduction of a cationic group, preferably a 2-hydroxypropyltrialkyl ammonium group is introduced on the starch. The alkyl chains of this quaternary ammonium compound may vary from 1 to 20 carbon atoms. For example, 1-chloro-2-hydroxypropyltrimethyl ammonium salt, glycidyltrimethyl ammonium salt, 1-chloro-2-hydroxypropyldimethylallyl ammonium salt or 1-chloro-2-hydroxypropylmethyldiallyl ammonium salt can be applied as cationization agent. Anionic substituents can be attached to the starch via an ether linkage. This may be achieved by reaction with for example chloroacetic acid of chloroacetic acid salts. Amphoteric derivatives may comprise any combination of the above cationic and anionic groups.

According to the invention, starch is oxidized using hydrogen peroxide. The amount of hydrogen peroxide employed is from about 0.01 to 5.0 wt. %, preferably about 0.05 to 2.5 wt. % anhydrous hydrogen peroxide on dry substance of the starch. The hydrogen peroxide will normally be used in the form of an aqueous solution, as commonly supplied in commerce.

Preferably, the oxidation reaction is performed in a solution, dispersion or suspension of the starch in water, to which the hydrogen peroxide, or an aqueous solution thereof, is added. Preferably, the hydrogen peroxide is added batchwise or dropwise.

Suitable concentrations of the starch in said solution, dispersion or suspension lie between 10 and 50, preferably between 20 and 40 wt. %, based on the weight of the solution, dispersion or suspension. The pH during the oxidation reaction will preferably around neutral and lie between pH 6.5 and 9.0. The temperature during the oxidation reaction in a suspension will preferably be below 60° C., more preferably between 20 and 50° C. When the reaction is carried out in a solution or dispersion, the temperature will usually be chosen between 60 and 200° C., preferably between 100 and 160° C. In order to carry out the reaction at a temperature higher than 100° C., use is preferably made of a jet cooker.

In accordance with the present invention, the oxidation of the specific starch described above is performed in the presence of a catalyst, which catalyst comprises divalent copper ions. The catalyst will preferably be used in the form of a salt. In principle, any copper(II)-salt which is soluble in water may be used. Suitably, the anion of the salt may be chosen from the group of chloride, sulfate, phosphate, nitrate, acetate, bromide and combinations thereof.

It is one of the great advantages of the present invention that the oxidation reaction proceeds very fast to a desired extent of degradation of the starch, while only very small amounts of the catalyst are used. More in particular, it has been found that such small amounts of catalyst suffice, that the amount of metal ions that ends up in the process water (mother liquor) is acceptably low. Said process water can conveniently be disposed together with normal sludge disposal without encountering the risk that the microorganisms present in the sludge are exterminated.

Preferably, the quantity of copper used ranges from about 5 ppb to about 5000 ppb, more preferably from about 100 to about 1000 ppb, on dry substance of starch. When the oxidation reaction is carried out in a solution or a dispersion, the quantity of copper may be lower (e.g. between 5 and 1000 ppb) than when the reaction is performed in a suspension.

In a preferred embodiment, the action of the divalent copper ions is enhanced by calcium, vanadium, manganese, iron and/or tungsten ions. The counterions for these ions may be of the same type as those of the copper catalyst. These additional salts will preferably be used in an amount between about 100 and about 2000 ppm, on dry substance of starch.

The invention further relates to an oxidized starch obtainable by a process as described hereinabove, and to the use of said oxidized starch in the paper, adhesive, textile and food industries.

In the paper industry, oxidized starches have been used as coating binders since 1903. The main purpose of coating paper is to improve its printability. The most important components of a coating (also referred to as coating color) are pigments, such as titanium oxide, calcium carbonate, clays, and the like, binders, such as latices, starches, PVOH, proteins, and the like, and water. The present oxidized starches have been found to have excellent properties, such as a good viscosity stability when in solution or dispersion. This makes them highly suitable for use as a binder in paper coatings.

In another application, the present oxidized starch, particularly when prepared from a cationic starch derivative, may be used as an emulsifying agent for, or during production of, alkyl ketene dimers, alkyl succinic anhydride or alkyl isocyanates (analogous to what has been described in e.g. WO-A-96/31650, EP-A-0 824 161 and EP-A-0 369 328).

In addition, it has been found that the present oxidized starch is highly suitable for replacing high viscous hydrocolloids, such as polyvinyl alcohol, guar, alginate, carboxymethylcellulose or hydroxyethylcellulose.

Yet another application wherein the present oxidized starch has been found to be highly suitable is in adhesives. The present oxidized starch may be used to adhere two or more layers of paper together to form a multi-layer paper or (card)board. Also, aluminum foil can suitably be adhered onto paper by use of an oxidized starch according to the invention. Further, the present oxidized starch may be used as a component in paper sack adhesives and wall paper adhesives, leading to an adhesive providing improved binding strength. In addition, paper and tape may be gummed with the present oxidized starch to produce stamps or envelopes. In abrasive paper or abrasive linen, the present oxidized starch may be used to adhere abrasive particles, such as sand, onto the paper or linen. In addition, the present oxidized starch may be used as an adhesive for seeds or fertilizers.

Still another application is related to the stabilization of emulsions, in particular of emulsions used in the adhesive industry such as polyvinylacetate emulsions. An oxidized starch according to the invention may be used as a protective colloid for providing the desired stability.

In the textile industry, the present oxidized starch may be used to improve the weaving operation or weaving efficiency by warp yarn sizing. This results in an improved abrasion resistance of the warp yarns during the weaving process and less warp-end breakages. The present oxidized starch may further be applied as finishing agent to give a smooth and firm hand to fabrics. It may also be used for the coating of glass fibers (fabrics and non-wovens). In addition, it may be used as blanket adhesive in the textile printing industry.

In the food industry, Arabic gum may be replaced in e.g. confectioneries by an oxidized starch according to the invention. Also, the present product has been found to be highly suitable as a thickener in various food products, such as sauces. The excellent stability of the present oxidized starch, leads in these applications to a more clear food product.

It will be clear to the skilled person that the above list of applications is not intended to be extensive and that many more applications of the present oxidized starches are conceivable. In practice, the present product may be used in any application in which oxidized starches have conventionally been used.

The invention will now be elucidated by the following non-restrictive examples.

EXAMPLES

Brookfield Viscosity

The Brookfield viscosity (in mPa.s.) is measured at a 25 w/w % solution (dispersion) of the product in water at 50° C. with a Brookfield viscometer (model RV-II+; 20 rpm). The stability of the starch solution was determined by measuring the Brookfield viscosity after 24 hours of storage at 50° C.

Intrinsic Viscosity

The intrinsic viscosity, expressed in dL/g, is determined in a known manner, for instance as described in H. W. Leach in Cereal Chemistry, vol. 40, page 595 (1963), using an Ubbelohde viscosity meter and a 1 M sodium hydroxide in water as the solvent.

Peroxide Test

The peroxide test is performed with Merckoquant 1.10081.0001 peroxide-test analytical test strips. The test was positive, indicating that there was still some hydrogen peroxid in the reaction mixture, or negative, indicating that the hydrogen peroxide was consumed.

Example 1

2.5 mole of amylopectin potato starch was suspended in 633 g of demineralized water. The temperature of the suspension was increased to 40° C. and 2.7 mL of a solution of 550 mg $CuSO_4.5H_2O$ in 1 L of demineralized water was added. 20 ml of a 30 wt. % hydrogen peroxide solution in water was added. During the oxidation the pH was maintained at 7.0 by the addition of a 4.4% sodium hydroxide solution in demineralized water. After 24 h of the reaction mixture the peroxide test was carried out. Subsequently, the mixture was neutralised to pH 5.0 by the addition of 10 N $H_2SO_4$, whereupon the product was dewatered and washed before drying.

Instead of amylopectin potato starch, potato starch, waxy corn starch or tapioca starch was used as starting material. Besides, 5.4 mL of a solution of 550 mg $CuSO_4.5H_2O$ in 1 L of demineralized water was added in stead of 2.7 mL. The results are shown in table 1.

TABLE 1

The hydrogen peroxide oxidation of different starches at (8.0 g hydrogen peroxide per mole starch, 40° C., pH 7.0, during 24 hour) catalyzed by various amounts of copper-ions.

| Starch-type (intrinsic viscosity starting material) | Cu ppb[3] | Peroxide test | Intrinsic viscosity (dL/g) | Brookfield viscosity (mPa · s.) after 0 and 24 hours storage at 50° C. | |
|---|---|---|---|---|---|
| | | | | 0 h | 24 h |
| Potato | | | 2.54[2] | | |
| | 0 | positive | 2.52 | n.a.[1] | |
| | 932 | positive | 0.28 | 100.000 | gel |
| | 1858 | negative | 0.26 | 50.000 | gel |
| Waxy-corn | | | 1.69[2] | | |
| | 932 | positive | 1.66 | n.a.[1] | |
| | 1858 | positive | 1.50 | n.a.[1] | |
| Tapioca | | | 2.19[2] | | |
| | 932 | positive | 1.17 | n.a.[1] | |
| | 1858 | positive | 0.75 | n.a.[1] | |
| Amylopectin potato | | | 2.26[2] | | |
| | 0 | positive | 1.85 | n.a.[1] | |
| | 932 | negative | 0.20 | 37 | 37 |
| | 1858 | negative | 0.20 | 35 | 37 |

[1]n.a. = not available due to very high viscosity of the 25 w/w % suspension of the product
[2]Intrinsic viscosity of the starting material
[3]Amount of catalyst calculated on dry starch Comparison of the results presented in table 1, shows that the hydrogen peroxide degradation of starch catalyzed by small amounts of copper ions is more efficient in the order: waxy corn starch<tapioca starch<potato starch<amylopectin potato starch. Without the addition of copper ions the hydrogen peroxide of potato starch is negligible. Under the same reaction conditions amylopectin potato starch reacts slowly.

Besides, it can be seen that the viscosity of the solution of the degraded amylopectin potato starch during storage at 50° C. is very stable. A solution of the degraded potato starch is very unstable and a gel is formed.

Example 2

The reaction of Example 1 was repeated with amylopectin potato starch and 0.0125 mole of calcium ions instead of $CuSO_4. 5H_2O$.

The results are presented in table 2.

Example 3

The reaction of Example 1 was repeated with amylopectin potato starch and 0.0125 mole of calcium ions and 0.36 mL of a solution of 550 mg $CuSO_4.5H_2O$ in 1 L of demineralized water instead of 2.7 mL of a solution of 550 mg $CuSO_4.5H_2O$ in 1 L of demineralized water.

The results are presented in table 2.

TABLE 2

The hydrogen peroxide oxidation of amylopectin potato starch at (8.0 g hydrogen peroxide per mole starch, 40° C., pH 7.0, during 24 hours) catalyzed by 1240 ppm calcium ions and a combination of 1240 ppm calcium ions and 110 ppb copper-ions.

| Cu ppb[1] | Peroxid test | Brookfield viscosity (mpa · s.) | Intrinsic viscosity (dL/g) |
|---|---|---|---|
| 0 | positive | 5150 | 1.38 |
| 110 | positive | 1620 | 1.10 |

[1]Amount of catalyst calculated on dry starch

The hydrogen peroxide oxidation of amylopectin potato starch is catalyzed by calcium ions. Calcium ions are less effective than copper ions. The combination of calcium ions and copper ions lead to a more effective degradation of the amylopectin potato starch.

Example 4

2.5 mole of cationic (MSin=0.035) amylopectin potato starch was suspended in 633 g of demineralized water. The temperature of the suspension was increased to 40° C. and 2.7 mL of a solution of 550 mg $CuSO_4.5H_2O$ in 1 L of demineralized water was added. 1.25 ml of a 30 wt. % hydrogen peroxide solution in water was added. During the oxidation the pH was maintained at 7.0 by the addition of a 4.4% sodium hydroxide solution in demineralized water. After 24 h of the reaction mixture the peroxide test was carried out. Subsequently, the mixture was neutralised to pH 5.0 by the addition of 10 N $H_2SO_4$, whereupon the product was dewatered and washed before drying.

Instead of cationic amylopectin potato starch, cationic potato starch (MSin=0.035) was used as starting material. Besides, 2.5, 5.0 or 7.5 mL of a 30 wt. % hydrogen peroxide solution in water was added instead of 1.25 mL. The results are summarized in Table 3.

TABLE 3

The hydrogen peroxide concentration of cationic
potato starches (932 ppb $Cu^{2+}$, 40° C., pH 7.0 during 24 hours)

| Starch type | 30 wt. % $H_2O_2$ (mL/mol) | Peroxide test | Brookfield viscosity (mPa · s.) in 10 wt. % concentration |
|---|---|---|---|
| Cationic | 0.50 | positive | 2300 |
| potato | 1.00 | positive | 290 |
| starch | 2.00 | positive | 66 |
|  | 3.00 | positive | 28 |
| Cationic | 0.50 | negative | 250 |
| amylopectin | 1.00 | negative | 83 |
| potato | 2.00 | negative | 33 |
| starch | 3.00 | negative | 18 |

Example 5

2000 Grams of starch were suspended in 2L of water. To this suspension, 120 grams of a 25% solution of NaOH was added. The suspension was stirred for 30 minutes at 90° C. Subsequently, 75 grams of a 30% aqueous solution of hydrogen peroxide was added and the stirring was continued at the same temperature. The conditions employed are illustrative of a thermochemical conversion process.

The above procedure was performed twice. Once, the starch was regular potato starch (PS), and once the starch was amylopectin potato starch (APS). In the case of APS, the reaction was complete after 30 minutes, which was determined by establishing that no hydrogen peroxide was present. The obtained product was stable. In the case of PS, the reaction was complete after 60 minutes, which was determined by establishing that no hydrogen peroxide was present. The obtained product was very unstable; even at 90° C. a thickening effect was observed.

What is claimed is:

1. A process for oxidizing starch comprising treating a root or tuber starch comprising at least 95 wt. % of amylopectin based on dry substance of the starch, or a derivative thereof, with hydrogen peroxide in the presence of a catalyst, wherein the catalyst comprises divalent copper ions in an amount from about 5 ppb to about 5000 ppb based on dry substance of starch.

2. A process according to claim 1, wherein the catalyst is selected from the group consisting of copper (II) chloride, copper (II) sulfate, copper (II) phosphate, copper (II) nitrate salt, copper (II) acetate salt, copper (II) bromide salt and combinations thereof.

3. A process according to claim 1, wherein the catalyst is present in an amount from about 100 ppb to about 1000 pbb, based on dry substance of the starch.

4. A process according to claim 1, wherein the divalent copper ions are enhanced by one or more of calcium, vanadium, manganese, iron or tungsten ions.

5. A process according to claim 1, wherein the starch is a potato starch or tapioca starch.

6. A process according to claim 1, wherein the hydrogen peroxide is used in an amount ranging from 0.01 to 5.0 wt. % based on dry substance of starch.

7. A process according to claim 1, wherein the hydrogen peroxide is used in an amount ranging from 0.05 to 2.5 wt. % based on dry substance of starch.

8. A process according to claim 1, wherein the derivative of the starch is a cationic, anionic or amphoteric starch.

9. A process according to claim 1, wherein a pH of between 6.5 and 9.0 is maintained during the process.

10. A process according to claim 1, wherein a stable, oxidized starch product is obtained within thirty minutes.

* * * * *

UNITED STATES PATENT AND TRADEMARK OFFICE
CERTIFICATE OF CORRECTION

PATENT NO. : 6,822,091 B1
DATED : November 23, 2004
INVENTOR(S) : Kesselmans et al.

It is certified that error appears in the above-identified patent and that said Letters Patent is hereby corrected as shown below:

Title page,
Item [57], ABSTRACT, now reads "The invention relates a process...", and should read -- The invention relates to a process... --.

Column 1,
Line 60, now reads "from groups VIIb, VIIb", and should read
-- from groups VIb, VIIb --.
Line 61, now reads "lanthamide", and should read -- lanthanide --.

Column 3,
Lines 42 and 60, now reads "cassaye", and should read -- cassave --.

Signed and Sealed this

Fifth Day of April, 2005

JON W. DUDAS
*Director of the United States Patent and Trademark Office*